United States Patent [19]
Pellow

[11] 4,418,528
[45] Dec. 6, 1983

[54] MODULAR GAS TURBINE ENGINE

[75] Inventor: Terrence R. Pellow, Watford, England

[73] Assignee: Rolls-Royce Limited, London, England

[21] Appl. No.: 196,114

[22] Filed: Oct. 10, 1980

[30] Foreign Application Priority Data

Nov. 3, 1979 [GB] United Kingdom ................. 7938143

[51] Int. Cl.³ .............................................. F02C 3/10
[52] U.S. Cl. .................................. 60/39.161; 60/39.31
[58] Field of Search ............ 60/39.08, 39.16 R, 39.31; 415/68, 69, 189, 190

[56] References Cited

U.S. PATENT DOCUMENTS

| | | | |
|---|---|---|---|
| 2,912,823 | 11/1959 | Lawson | 60/39.16 R |
| 3,823,553 | 7/1974 | Smith | 60/39.31 |
| 3,902,314 | 9/1975 | Straniti | 60/39.31 |
| 4,030,288 | 6/1977 | Davis et al. | 60/39.31 |

Primary Examiner—Louis J. Casaregola
Attorney, Agent, or Firm—Cushman, Darby & Cushman

[57] ABSTRACT

A modular gas turbine engine comprises a gas generator module and a power turbine module. The shafts carried within each module are mounted on bearings which are arranged such that the downstream bearing of the gas generator module and all of the bearings of the power turbine module are contained within a common chamber which is defined by portions of both the gas generator module and the power turbine module.

4 Claims, 1 Drawing Figure

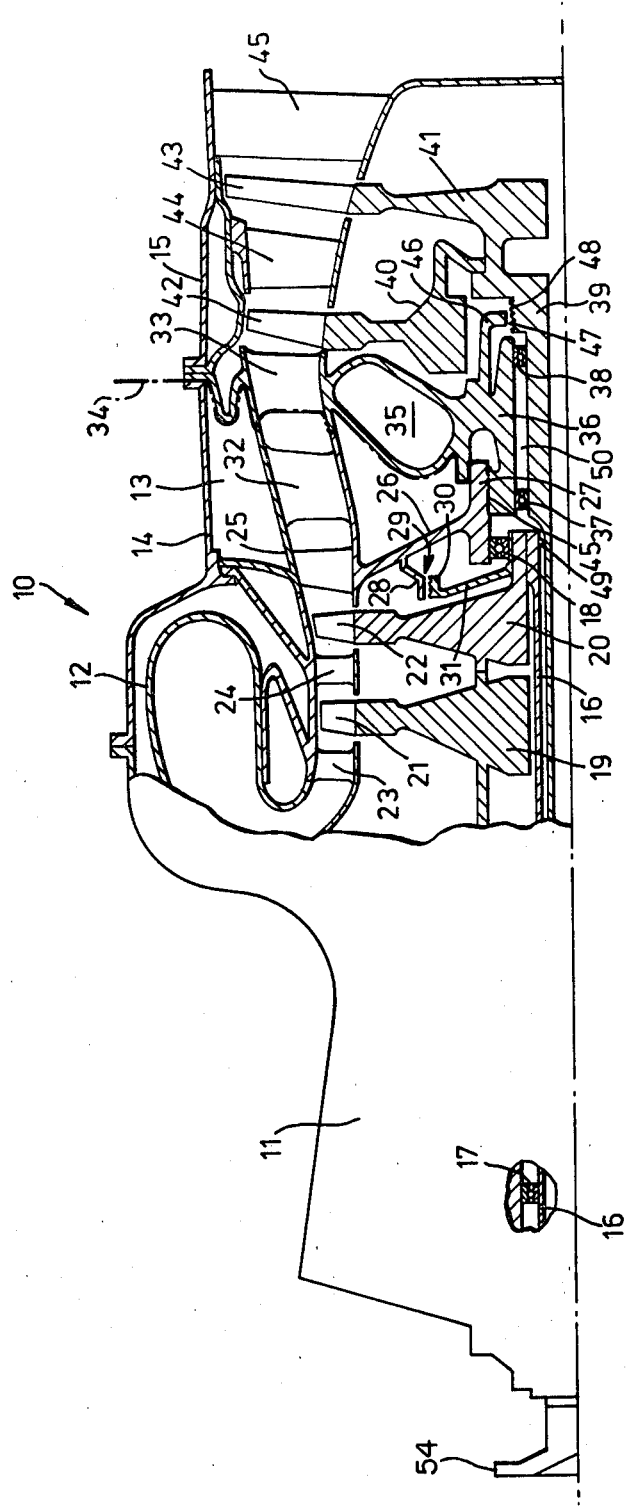

MODULAR GAS TURBINE ENGINE

This invention relates to modular gas turbine engines.

It is becoming an increasingly common practice to produce gas turbine engines which are of modular construction. Such engines are usually designed so that they may be readily divided into their major constituent parts or modules. This greatly reduces the time during which engines are out of use as a result of repair work and overhauls. Thus if a particular module requires attention, it may be replaced by a spare module, thereby permitting the rapid return to service of the engine whilst work is carried out on the original module.

In order to ensure their true modularity, engine must be so designed that each module is as mechanically independent of its adjoining module or modules as possible. Thus the bearings which carry the main engine shafts must be so positioned that the shafts carried by each module are provided with adequate independent support when the modules are separated. This has usually meant that the bearings have had to be spaced out throughout the length of the engine. However such an arrangement is unsatisfactory in view of the complexities of oil supply and bearing cooling it creates, especially at the hot turbine end of the engine.

It is an object of the present invention to provide a modular gas turbine engine in which such bearing oil supply and cooling is simplified.

According to the present invention, a modular gas turbine engine comprises a gas generator module and a power turbine module, each module in turn comprising rotary members carried by a rotary shaft, each rotary shaft and rotary member assembly being supported from the static portions of its respective module by a plurality of bearings which bearings are so positioned that the bearings within the power turbine module and the downstream bearing within the gas generator module are located within a common bearing chamber which chamber is defined by portions of both said gas generator module and said power turbine module.

Each of said rotary shafts is preferably supported from the static portions of its respective module by two axially spaced apart bearings.

Said bearings within said power turbine module are preferably so spaced apart as to provide support for its respective shaft when said power turbine module and said gas generator module are separated.

Said shaft supported within said power turbine module preferably terminates at the upstream end of said engine in a power output flange.

The invention will now be particularly described with reference to the accompanying drawing, which is a partially sectioned side view of a portion of a gas turbine engine in accordance with the present invention.

With reference to the drawing, a gas turbine engine generally indicated at 10 comprises, in flow series, a compressor 11, combustion equipment 12 and a turbine 13. The compressor 11 is generally of the axial flow type with the exception of its final stage which is of the centrifugal flow type. The centrifugal stage directs the compressed air in a radially outward direction to the combustion equipment 12 which is of the reverse flow type.

The gas turbine engine 10 is of modular construction, the modules including a gas generator module 14 and a power turbine module 15. The gas generator module 14 comprises the compressor 11, combustion equipment 12 and that portion of the turbine 13 which drives the compressor 11. The power turbine module 15 comprises the remaining portion of the turbine 13.

The gas generator module 14 includes rotary and static portions, the rotary portions being carried by a shaft 16 and the whole assembly mounted on the static module portion by means of two axially spaced apart bearings 17 and 18. More specifically, the turbine section of the rotary portion comprises two interconnected discs 19 and 20 which carry annular arrays of rotary aerofoil blades 21 and 22 respectively. The rotary aerofoil blades 21 and 22 are axially alternately spaced between annular arrays of stator aerofoil blades 23, 24 and 25 which are mounted on the static portions of the module 14 downstream of the combustion equipment 12.

The stator aerofoil blade 25 is provided with a radially inwardly directed member 26 which terminates in an annular bearing support 27. The bearing support 27 provides the static support for the downstream bearing 18 of the gas generator module 14. It also carries one element 28 of a labyrinth seal 29, the other element 30 being carried by an annular member 31 attached to the disc 20.

Two further annular arrays of stators 32 and 33 are located downstream of the stators 25. The first array of stators 32 is the last array of the gas generator module 14 and the second array 33 is the first stator array of the power turbine module 15. The dividing line between the gas generator module 14 and the power turbine module 15 passes between the arrays of stators 32 and 33 and is indicated by the line 34.

The first stator array 33 of the power turbine 15 is provided with a radially inwardly directed member 35 which terminates in an elongate annular bearing support 36. Two axially spaced apart bearings 37 and 38 which are mounted on the bearing support 36 support the power turbine shaft 39.

The power turbine shaft 39 carries two discs 40 and 41 which in turn carry two annular arrays of rotary aerofoil blades 42 and 43. The rotary aerofoil blades 42 and 43 are axially alternately spaced between the annular array of stator blades 33 and two further downstream annular arrays of stator blades 44 and 45, the stator blades 33, 44 and 45 all being mounted on the static portions of the power turbine module 15. The power turbine shaft 39 extends through the gas generator shaft 16 to terminate in a power output flange 54 located at the front of the engine 10.

The elongate bearing support 36 is provided with an annular re-entrant feature 45 which is adapted to receive the downstream portion of the bearing support 27 in sealing engagement. It also carries one element 46 of a labyrinth seal 47, the other element 48 being carried by the power turbine shaft 39.

An oil seal 49 is provided between the gas generator shaft 16 and the power turbine shaft 39 at a position radially inwardly of the bearing 18. Consequently the oil seal 49 and the labyrinth seals 29 and 47 together with various other portions of the gas generator module and power turbine module serve to define a chamber 50 which contains the downstream bearing 18 of the gas generator module 14 and both bearings 37 and 38 of the power turbine module 15.

It follows that since the module dividing line 34 passes between the arrays of stators 32 and 33, it also passes through the bearing chamber 50. Consequently when the modules 14 and 15 are separated, each of their respective shafts 16 and 39 is supported by two sets of axially spaced apart bearings so that each of the shafts 16 and 39 is provided with adequate independent support within its own module.

Since the bearings 18, 37 and 38 are all contained within a single chamber 50, their supply with lubricant and cooling air is much simpler than would be the case if they were in a number of discrete spaced apart chambers.

I claim:

1. A modular gas turbine engine comprising:

a gas generator module including a static portion, rotary members contained within the static portion of said gas generator module, a rotary shaft for said gas generator module and supporting said rotary members thereof, a plurality of bearings carried by the static portion of said gas generator module and supporting said rotary shaft therefrom;

a power turbine module adapted to be detachably attached to said gas generator module and including a static portion, rotary members contained within the static portion of said power turbine module, a rotary shaft for said power turbine module and supporting said rotary members thereof, a plurality of bearings carried by the static portion of said power turbine module and supporting said rotary shaft therefrom; and a common bearing chamber defined by a portion of said gas generator module and a portion of said power turbine module, at least a downstream one of said plurality of bearings for the rotary shaft of said gas generator module and said plurality of bearings for the rotary shaft of said power turbine module being positioned within said common bearing chamber whereby when said gas generator module and said power turbine module are separated, each rotary shaft of the respective module remains fully supported by the respective plurality of bearings carried by the respective static portion.

2. A modular gas turbine engine as claimed in claim 1 wherein each of said rotary shafts is supported from the static portions of its respective module by two axially spaced apart bearings.

3. A modular gas turbine engine as claimed in claim 1 wherein said bearings within said power turbine module are so spaced apart as to provide support for its respective shaft when said power turbine module and said gas generator module are separated.

4. A modular gas turbine engine as claimed in claim 1 wherein said shaft supported within said power turbine module terminates at the upstream end of said engine in a power output flange.

* * * * *